Feb. 23, 1965   A. J. VAN NOORD   3,170,211
SAFETY SEAT BUCKLE
Filed May 16, 1963

INVENTOR.
Andrew J. Van Noord
BY
Dale A. Winnie
ATTORNEY

United States Patent Office 3,170,211
Patented Feb. 23, 1965

3,170,211
SAFETY SEAT BUCKLE
Andrew J. Van Noord, Grand Rapids, Mich., assignor to Kent Engineering Consultants, Grand Rapids, Mich., a partnership of Michigan
Filed May 16, 1963, Ser. No. 280,801
12 Claims. (Cl. 24—230)

This invention relates to safety seat belts and more particularly to a new, novel, more attractive and more satisfactory means of retaining the ends of a safety seat belt engaged together.

Safety seat belts have long been known and used on military and commercial aircraft, racing and sports cars, and elsewhere where assistance, short use, and/or immediate personal safety are encouraging factors. However, despite the known and well publicized merits of safety seat belts few are installed on family cars and few of those which are installed are used as often as is desirable.

Heretofore, safety experts and seat belt manufacturers have tried to encourage the use of commonly known types of seat belts on regular automotive vehicles. Most of these include fastener means which are heavy, bulky, difficult to manipulate, require more than passive attention to set properly, cause belt wear and abrasion, and such as cannot be readily disconnected in an emergency. Accordingly, automotive users who are in and out of their car frequently, have large families, or abhor the inconvenience and discomfort of long and continuous use have not been disposed to either buy, install or use safety seat belts in their cars.

It is an object of this invention to provide a safety seat belt having a fastener means which is light in weight, attractive in appearance, simple in operation and exceptionally effective in use to enhance and encourage the use of safety seat belts in automotive vehicles.

It is an obpect of this invention to provide a seat belt buckle for use with safety seat belts which is small and compact in size, includes a minimum number of parts, is readily assembled, and is inexpensive to manufacture in order that the retail price may be attractive to potential customers.

It is an object of this invention to provide a seat belt buckle having the operative mechanism shielded and enclosed within an attractive and simple cover member which also serves as the means of disengaging the seat belt ends.

It is an object of this invention to provide a keeper or latching member in the seat belt buckle which may be operated within and independent of the cover member, to hook up the ends of the seat belt straps, without special attention beyond inserting the end of a seat belt strap to be engaged therein.

It is an object of this invention to provide a seat belt buckle which includes no operative parts that are susceptible to catching on a persons clothing.

In further and more specific detail, it is an object of this invention to provide a seat belt buckle including a simple housing having an adjustment bar, keeper or latch and biasing means provided therein and totally enclosed within a protective and functional cover member which is operatively engaged to the latch member for disengagement thereof. The latch member is also independently operable, without actuation of the cover member, and is adapted to receive a tongue member on the end of a seat belt strap to be retained in coplanar and retained engagement therewith with simple cover actuate a shearing movement between the latched members for separation thereof.

The arrangement of parts in the buckle, including the means affording pivotal control of the latch member, has been devised to assure an assembly which is small and compact in size and has an exceptionally low profile and clean and uncluttered appearance.

These and other objects and advantages to be gained in the practice of this invention will be better understood and appreciated upon a reading of the following specification in regard to a preferred embodiment of the invention and having reference to the accompanying drawings wherein.

Figure 1:
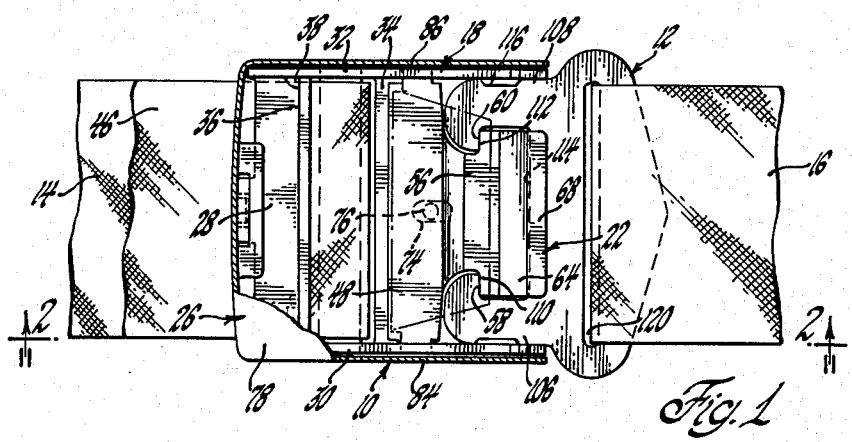
FIGURE 1 is a top plan view of the safety seat belt buckle of this invention, with the tongue member engaged therein, and having a part of the cover broken away to better show the inner operative parts thereof.

In general, the drawings show a seat belt buckle 10 receptive of a tongue member 12 in engagement therewith and having the buckle and tongue members engaged on the ends of cooperative safety seat belt straps 14 and 16, respectively.

The seat belt buckle 10 includes a housing part 18 in which is disposed an adjustment bar 20, receptive of the seat belt strap 14, and a keeper or latching member 22 biased by spring means 24 for engagement with the tongue member 12 when received therein.

The buckle housing part 18 is enclosed within a cover member 26 which is hinged to one end thereof and is operatively engaged to the latching member 22 near the other end of the housing where the tongue member is received.

Referring to the drawings in further detail:

The buckle housing part 18 is essentially a channel shaped member adapted to lay flat on its back and includes a bottom wall 28 and side walls 30 and 32.

The housing bottom wall 28 is formed to include an opening 34 spaced from one end thereof and extended between the side walls 30 and 32. This is accomplished by bending a part of the bottom wall into the housing with the part so formed left standing to provide an inner housing wall 36 at one end of the opening. Suitable shoulder tabs 38 are struck from the housing side walls 30 and 32 to back up the inner wall 36, as will be noted by reference to the different drawing figures.

The adjustment bar 20 is mounted between the housing side walls 30 and 32 over the bottom wall opening 34. The adjustment bar member 20 is circular in cross-section and includes a knurled surface 40. The ends of the bar are flattened, as at 42, and adapted to be received in elongated and forwardly inclined slots 44 provided in the side walls 30 and 32 forward of the inner housing wall 36.

The seat belt strap 14 is adapted to be received through the bottom wall opening 34 in the housing, around the adjustment bar 20, and to have the tag end of the strap, identified by number 46, received between the adjustable bar and the inner housing wall 36. In this manner, any strain between the seat belt strap 14 and the buckle, via the housing part 18, will hold the adjustment bar 20 against the inner wall 36 and the strap wedged therebetween. To change the effective length of the seat belt strap 14 it is merely required that this strain be temporarily relieved and that the strap be pulled or pushed around the adjustment bar 20 as it backs off from the housing wall 36.

Referring now to the keeper or latching member 22:

The keeper or latching member 22 is provided near the other end of the housing part 18 and apart from the adjustment bar 20. It includes a generally flat and plain surfaced member although its ends and intermediate part are shown at slightly different elevations for reasons to be described and apart from its functional aspect.

The latching member has its inner disposed end 48 adapted for pivotal support between the housing side walls 30 and 32. It is of a width receptive between the side walls with square pin extensions 50 disposed therebeyond and received within receptive slots 52 provided in the housing side walls.

The side wall slots 52 extend vertically and include horizontally disposed slots 54 which are in communication with the upper ends thereof. The slots 54 are wide enough to receive the latching member end 48 in and through one thereof so that it can be laterally adjusted to enable the pin extension 50 on the other side to be engaged in the opposite side wall slots. When the latching member is centered between the side walls it is moved back in the housing until the pin extensions 50 drop in the depending slots 52 where the shouldered ends of the latch member, provided in forming the pin extensions, preclude subsequent lateral adjustment.

The pivotally supported end of the latching member is mounted on the side walls 30 and 32 and spaced from the bottom wall 28 to avoid interference therewith. It will also be noted that the lower end of the slots 52 are cut at an angle so that the forward lower corner edge of the pin extensions 50 have a line contact support on the side walls. This also places the pivotal axis of the latch member further forward so that a greater arc travel is attainable by the operative end within a given height; the significance of which will be later appreciated.

The intermediate part or midsection, 56, of the latching member 22 is narrower than the pivotal end 48 thereof. It is also disposed at a slightly lower elevation than the pivotal end which, as previously mentioned, is disposed higher to avoid interference with the housing bottom wall for better pivotal support.

A pair of outwardly disposed catch shoulders 58 and 60 are formed in the midsection of the latching member from the side edges thereof. These are spaced from the housing side walls 30 and 32 and are disposed in the plane of the latching member.

The housing bottom wall 28 is formed to include a pocket or depression 62 immediately under the part of the latching member including the catch shoulders 58 and 60. As will be appreciated later, this is principally to compensate for different material thicknesses of the latching member 22, tongue 12, and the cover member 26 and to assure certain features which are described later.

The forward disposed end 64 of the latching member 22 is inclined upwardly to provide a lifting cam surface 66 on the underside thereof which is engaged by the tongue member 12 in the pivotal actuation of the latching member. It also includes a lip 68 at its terminal end which is disposed for engagement with the cover member 26.

A V-shaped leaf spring member 70, laid on its side, is provided over the latching member 22 and biases it for engagement with the housing bottom wall 28. The upper disposed leg of the spring member includes side extensions 72, in the manner of the pivotal end 48 of the latching member, for engagement in the slots 54. The spring member extends across the latching member between the housing side walls 30 and 32 and has its lower leg engaged therewith. A slot 74 in the lower leg of the spring member is received over a projection 76 provided on the latching member to keep it centered thereover with its extensions 72 engaged in the side wall slots 54 to affect the required biasing.

The housing cover member 26 is formed to include a top wall 78, end walls 80 and 82, and side walls 84 and 86 which overlap and enclose the housing ends and side walls 30 and 32.

The cover end wall 80 is formed for hinged engagement with the end of the housing 18 by having an inbent tab 88, with an opening 90, receptive of a tab end 92 of the housing bottom wall 28 therethrough. The bottom wall tab 92 also includes an opening 94 which receives another cover end tab 96 therein during the final assembly to prevent the cover member from being lifted off the bottom wall tab.

The cover side walls 84 and 86 lie outside the housing side walls 30 and 32 and obscure the openings, and bar and latch member ends disposed therein.

The other cover end wall 82 is formed in slightly to provide an overhanging fingergrip edge 98 and has the terminal end 100 bent in and under the extended lip 68 of the latching member for lift engagement therewith.

The lower corners 102 of the inbent cover end wall part 100 are crimped under at a higher elevation to provide stops for engagement with extended shoulders 104 provided on the upper forward corners of the housing side walls 30 and 32.

Figure 2:
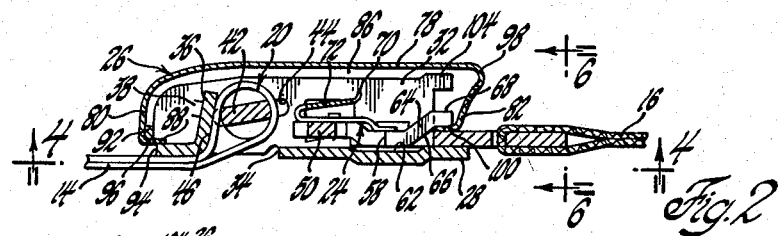
FIGURE 2 is a side and cross-sectional view taken essentially in the plane of line 2—2 of FIGURE 1 and looking in the direction of the arrows thereon.
Figures 3, 4:
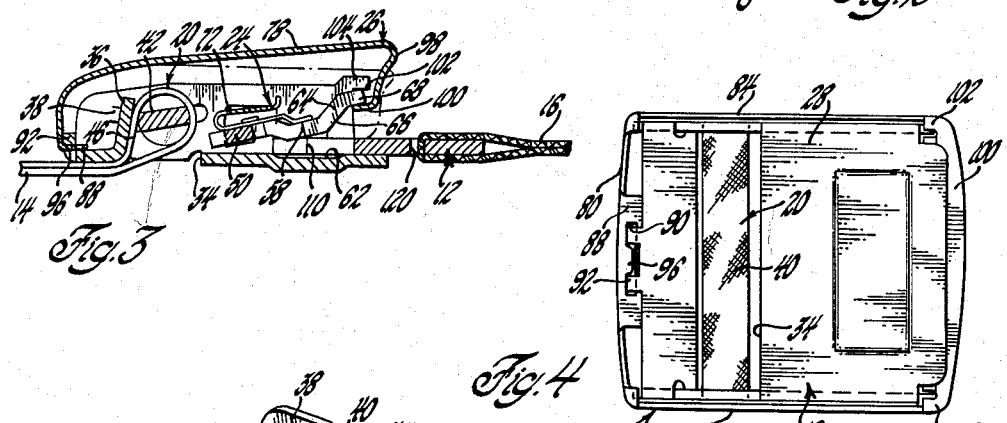
FIGURE 3 is similar to FIGURE 2 with the cover and latching mechanism shown in a different operative position.
FIGURE 4 is a bottom plan view of the seat belt buckle as seen in the plane of line 4—4 of FIGURE 2 and looking in the direction of the arrows thereon.
Figures 5, 6:
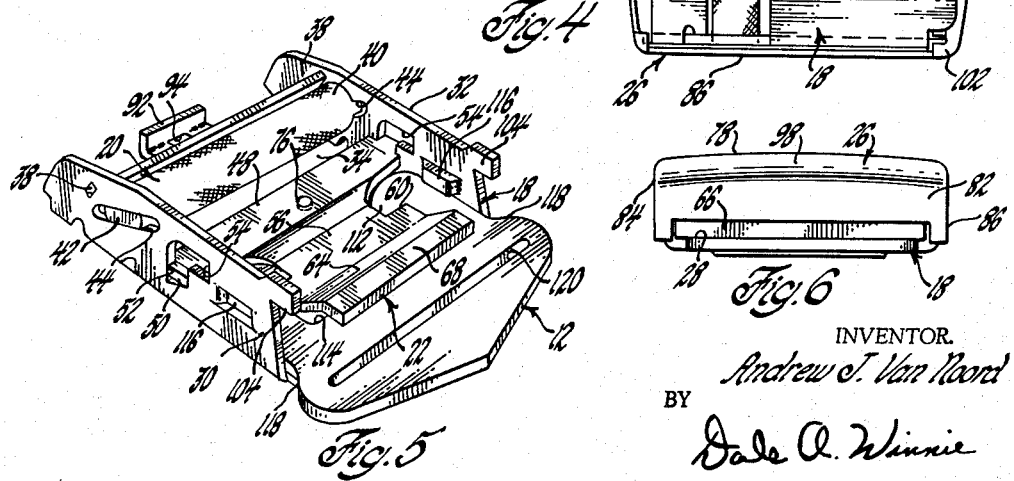
FIGURE 5 is a perspective view of the seat belt buckle, from one of the front corners, with the cover removed.
FIGURE 6 is an end view of the seat belt buckle as seen in the plane of line 6—6 of FIGURE 2.

It will be appreciated that the spring member 70, acting through the latching member 22, biases the cover member 26 in its enclosing relation over the housing 18. Also, while the cover member is operable of the latching member, as shown by a comparison of FIGURES 2 and 3, in opposition to the bias of the spring member, that the latching member 22 is operable separate from the cover member, as upon engagement by the tongue member 12 with the cover remaining in the dotted line position shown by FIGURE 3.

Of still further note at this time is the fact that the latching member 22, without the tongue member 12 (still to be described) engaged in the seat belt buckle 10, holds the cover member 26 engaged with the housing side walls 30 and 32, under the influence of the spring member 70, and rattle free.

The tongue member 12 includes a leading and bifurcated end having two parallel coplanar arms 106 and 108 with inwardly disposed catch shoulders 110 and 112 formed and provided near their terminal ends. The space 114 between the extended arms is formed to receive the forward disposed end 64 of the latching member 22 therewithin with the latch shoulders 58 and 60 disposed for interference engagement with the catch shoulders 110 and 112 of the tongue member.

The housing side walls 30 and 32 include detents 116 formed and extended into the housing 18 and spaced from the housing bottom wall 28 to guide the extended ends of the tongue member 12 as it is received into the seat belt buckle 10. They hold the tongue member in engagement with the housing bottom wall 28 so that its ends act on the cam surface 66 of the latching member 22 causing it to be lifted and the catch shoulders 110 and 112 thereof to pass under and into alignment with the catch shoulders 58 and 60 of the latching member.

The spring member 70 biases the latching member 22 towards the housing bottom wall 28 so that when the catch shoulders 110 and 112 pass under the latching member to where they are aligned under its catch shoulders the interengagement of the tongue 12 and latch member 22 is attained.

The outer disposed end of the tongue member 12 is enlarged to provide stop shoulders 118 to preclude insertion of the tongue member too far into the buckle housing. An elongated and laterally disposed slot 120 is provided to receive the seat belt strap 16 therethrough.

The general and basic attributes of this invention have been set forth in the preceding description of a preferred embodiment of the invention. However, certain other things are worth mentioning and repeating.

The seat belt buckle 10 includes a minimum of parts each of which is simple and relatively inexpensive to form by itself and which are easy to assemble to obtain the end product. It will be appreciated that simple stampings and commonly available stock material may be used in most instances.

The elongated slots 44 for the adjustment bar 20 enable it to be easily mounted between the housing side walls 30 and 32. The latching member 22 and spring 70 are likewise easily installed, as previously mentioned. All that follows is the assembly of the cover member 26 which has been described in sufficient detail to appreciate the simplicity of such operation.

The tongue member 12 is quite obviously a simple stamping.

Only the cover member 26 and tongue member 12 need include a finished surface since only these parts are visible in the final assembly; with the exception of the undersize of the housing bottom wall 20 when the buckle is turned over.

The operation, as mentioned, is simple.

The latch spring 70 holds the cover member engaged with the upper edges of the housing side walls 30 and 32 and its latch engaging lip 100 spaced from the housing bottom wall 28 sufficient to receive or be receptive of the tongue member 12 thereunder. The depression 62 in the housing bottom wall assures that the latch member 22 will rest on the inbent lip 100 of the cover member and not rest on the bottom wall of the housing with a gap left therebetween due to material thicknesses which might otherwise upset the rattle-free relationship provided for.

The extended arms 106 and 108 of the tongue member 12 are received into the housing 18, in the manner mentioned, to actuate the latch, independent of the cover member 26. This is so simple that any adult or child need be only told what to do without any other instructions or assistance.

The forwardly disposed pivotal axis of the latch member 22, near the tongue receptive end, enables greater travel of the catch shoulders 58 and 60 of the latch with a relatively small vertical elevation of the operative end 64 of the latching member so that the advantage of closely stacked parts to obtain an exceptionally low profile buckle is preserved. This low profile and clean uncluttered appearance provided by the cover member 26 adds appreciably to the appeal of the disclosed seat belt buckle.

Simple fingertip engagement, by either hand, with the cover lip 98, and upward movement, lifts the latching member 22 out of engagement with the tongue 12 and affects a release of the two belt straps. The simple shearing action between the engaged catch shoulders takes no appreciable pressure and is readily accomplished under any circumstances.

Although a preferred embodiment of this invention has been shown and described in detail, it will be appreciated that certain modifications and improvements are within the scope of the teachings set forth. Accordingly, such of these improvements and modifications as are within the spirit of the invention and are not specifically excluded by the language of the hereinafter appended claims, are to be considered as inclusive thereunder.

I claim:

1. A seat belt buckle, comprising:
a housing member open upwardly and having a bottom wall and parallel spaced side walls upstanding thereover,
a latching member provided in said housing and having one end formed and disposed for pivotal engagement with said side walls and the other end extended towards an end of said housing, spring means engaged between said side walls and said latching member for biasing said latching member for engagement with said housing bottom wall,
a cover member including top side and end walls receptive in enclosing relation over said housing member and having one end wall thereof received in hinged engagement with one end of the housing and the other end wall disposed in engagement with the extended end of said latching member,
said other cover member end wall and said extended latching member end being spaced from said housing bottom wall for receiving a member in said housing for engagement with said latching member.

2. The seat belt buckle of claim 1;
said housing side walls including elongated slots having latch end receptive depressions in communication therewith,
said latch member including laterally disposed extensions received in said slots and seated in said depressions,
and said spring means including a leaf spring member disposed between said side walls and engaged in said elongated slots.

3. The seat belt buckle of claim 1;
said housing and cover members being formed for cooperative engagement limiting the permissive pivotal movement of said cover member relative to said housing member.

4. The seat belt buckle of claim 1;
said cover member having the end thereof engaging said latching member folded under and disposed for engagement with the underside of the extended end thereof for lifting said latching member from engagement with said housing bottom wall and in opposition to said biasing means,
and said latching being operable independent of said cover member by a member received in said housing for engagement therewith.

5. The seat belt buckle of claim 4;
said cover member being formed to engage the upper edges of said housing side walls and to have the latch engaging end thereof hold said latching member spaced from said housing bottom wall and in cover holding biasing engagement therewith.

6. A latching member for use in seat belt buckles, and comprising;
a member having laterally disposed parts provided at one end thereof for pivotal support,
an intermediate section having laterally disposed and spaced catches formed substantially in the plane thereof,
the other end of said member being angularly disposed for elevation of said other end permitting passage of a member thereunder and into latching engagement with said laterally disposed and spaced catches,
said catches being provided in the opposite outer side edges of said intermediate section,
and said angularly disposed end being narrower than the pivotally supported end thereof.

7. A latch assembly for use in seat belt buckles, and comprising;
a substantially flat latch member having means of pivotal support provided at one end thereof and laterally disposed and spaced catch shoulders formed in the plane thereof and spaced from the other end thereof,
a substantially flat tongue member adapted for engagement with said latch member and having laterally disposed and spaced catch shoulders formed in the plane thereof complementary of said latch member catch shoulders and spaced from the end thereof,
and one of said latching and tongue members being bifurcated for receiving the other thereof therein and in coplanar catch shoulder engaging relation therewith.

8. The latch assembly of claim 7, said latch member being pivotally actuatable for elevating the catch shoulders thereof out of engagement with the catch shoulders of said tongue member and for the release thereof.

9. The latch assembly of claim 7, said latch member having outwardly disposed catch shoulders and said tongue member being bifurcated and having inwardly disposed catch shoulders.

10. The latch assembly of claim 9, said latch member having an angularly disposed end receptive of said tongue member thereunder for pivotal actuation of said latch member permissive of the receipt of said tongue member thereunder and into catch shoulder engagement therewith.

11. The latch assembly of claim 7, including, means engaging and biasing said latch member in a tongue latching position, and means guiding said tongue member for latch lifting pivotal actuation thereof in opposition to said biasing means and into catch shoulder engagement therewith.

12. A seat belt buckle assembly, comprising:
a buckle member including an upwardly open housing member having a bottom wall and upwardly disposed parallel spaced side walls,
a latch member received in said housing member and having one end formed to include lateral parts engaging and pivotally supporting said latch member on said side walls,
a flat spring member engaged between said side walls and said latch member and biasing said latch member for engagement with said housing bottom wall,
a cover member including top side and end walls and receptive of said housing member and the side walls thereof in enclosed relation therein,
said cover member having one end wall received in hinged engagement with said housing bottom wall and the other end wall thereof terminating short of the plane of said bottom wall and providing a tongue receptive opening therebetween,
said latch member having the operative end thereof disposed towards said tongue receptive opening,
and said cover member being formed for engagement with the underside of the operative end of said latch member and pivotal actuation thereof in opposition to the bias of said spring member;
a tongue member receptive in said tongue receptive opening for engagement with said latch member,
said tongue and latch members being formed to include laterally disposed and cooperative catch shoulders substantially in the plane of each thereof,
said tongue member having a bifurcated end receptive of said latch member therein and in coplanar relation therewith;
said tongue member being pivotally operative of said latch member independent of said cover member and in opposition to the bias of said spring member upon engagement with the operative end thereof,
and means formed from said housing side walls for guiding said tongue as received in said housing and retaining said tongue in engagement with the bottom wall of said housing for catch shoulder engagement with said latch member.

References Cited by the Examiner

UNITED STATES PATENTS

| 435,360 | 8/90 | Kaylor | 24—230.1 |
| 2,650,398 | 9/53 | Bangs | 24—230.1 |
| 2,965,942 | 12/60 | Carter | 24—230.1 |
| 2,985,917 | 5/61 | Sunday | 24—230.1 |
| 3,013,317 | 12/61 | Weber | 24—230.1 |
| 3,091,010 | 5/63 | Davis | 24—230.1 |

FOREIGN PATENTS 709,162   8/31   France.

DONLEY J. STOCKING, *Primary Examiner.*